United States Patent
Peri et al.

(10) Patent No.: US 7,581,213 B2
(45) Date of Patent: Aug. 25, 2009

(54) ALLOCATING AUTOMATIC VARIABLES TO DIFFERENT MEMORY BANKS

(75) Inventors: Ramesh V. Peri, Austin, TX (US); Srinivas Doddapaneni, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 932 days.

(21) Appl. No.: 10/875,958

(22) Filed: Jun. 25, 2004

(65) Prior Publication Data

US 2005/0289322 A1 Dec. 29, 2005

(51) Int. Cl.
*G06F 9/45* (2006.01)
(52) U.S. Cl. .......................... 717/157; 717/144; 717/156
(58) Field of Classification Search .................. None
See application file for complete search history.

(56) References Cited

U.S. PATENT DOCUMENTS

| | | | | |
|---|---|---|---|---|
| 6,421,824 | B1 * | 7/2002 | Click et al. | 717/144 |
| 6,523,173 | B1 * | 2/2003 | Bergner et al. | 717/152 |
| 7,069,548 | B2 * | 6/2006 | Kushlis | 717/156 |
| 7,278,137 | B1 * | 10/2007 | Fuhler et al. | 717/153 |

OTHER PUBLICATIONS

Avissar et al., "An Optimal Memory Allocation Scheme for Scratch-Pad-Based Embedded Systems", Nov. 2002, ACM, pp. 6-26.*
Ko et al., "Partitioning for DSP Software Synthesis", Oct. 17, 2003, Springer-Verlag Berlin Heidelberg, pp. 344-358.*
Souter et al., "Incremental Cell Graph Reanalysis for Object-Oriented Software Maintenance", 2001, IEEE, pp. 1-10.*
Barua et al., "Compiler Support for Scalable and Efficient Memory Systems", 2001 IEEE, pp. 1234-1247.*
Udayakumaran et al., "Compiler-Decided Dynamic Memory Allocation for Scratch-Pad Based Embedded Systems", 2002 ACT, pp. 1-11.*
Viera Sipkova, "Efficient Variable Allocation to Dual Memory Banks of DSPs", 2003, Springer-Verlag Berlin Heidelberg, pp. 359-372.*

* cited by examiner

*Primary Examiner*—Tuan Q Dam
*Assistant Examiner*—Ben C Wang
(74) *Attorney, Agent, or Firm*—Venable LLP; James R. Burdett; Jeffri A. Kaminski (57) ABSTRACT

A method including analyzing a program to obtain information about variables within the program, generating a call graph based on the information, determining all possible aliases for each variable, identifying parallel accesses by two variables, a variable and an alias, and/or two aliases during an instruction in the program, generating an interference graph based on the parallel accesses, and assigning the variables to logical stacks based on the interference graph.

20 Claims, 6 Drawing Sheets

ALLOCATING AUTOMATIC VARIABLES TO DIFFERENT MEMORY BANKS

BACKGROUND OF THE INVENTION

Functions in object-oriented programs, such as C/C++ programs, may define automatic variables that are visible only within the body of the defining function. Each invocation (call) of a function at runtime may create an instance of automatic variables defined in the function. The lifetime of automatic variables in a function may be the same as the duration of a call that instantiated the automatic variables, for example. Automatic variables may be implemented by allocating them on a stack. Modern computer architectures, such as embedded processors, may organize memory in multiple banks with the intention of enabling multiple accesses to memory in a single instruction and completing them in a single cycle. This memory banking may apply well to global variables because the programmer has flexibility to locate them anywhere in address space. However, the stack based implementation of automatic variables is not suitable for allocating automatic variables to multiple memory banks. For example, some instructions may take a stall cycle because the instruction may make two memory accesses to the same bank.

BRIEF DESCRIPTION OF THE DRAWINGS

Various exemplary features and advantages of embodiments of the invention will be apparent from the following, more particular description of exemplary embodiments of the present invention, as illustrated in the accompanying drawings wherein like reference numbers generally indicate identical, functionally similar, and/or structurally similar elements.

DETAILED DESCRIPTION OF EXEMPLARY EMBODIMENTS OF THE PRESENT INVENTION

Exemplary embodiments of the invention are discussed in detail below. While specific exemplary embodiments are discussed, it should be understood that this is done for illustration purposes only. A person skilled in the relevant art will recognize that other components and configurations may be used without parting from the spirit and scope of the invention.

Exemplary embodiments of the present invention may provide a system and method to maintain multiple stacks that reside in different memory banks and to allocate the automatic variables to these stacks. In an exemplary embodiment of the invention, a compiler may allocate automatic variables to various stacks (each located in a different memory bank) depending on the access patterns to minimize the cycle count associated with executing the program, for example. Although maintaining multiple stacks may increase the ability to access local variables in parallel, maintaining multiple stacks may incur a cost in terms of maintaining the pointers to these stacks. For example, it may be necessary to dedicate a stack pointer and allocate and de-allocate space on each stack if and when the need arises.

In an exemplary embodiment of the invention, a compiler may allocate automatic variables to memory banks to minimize execution time. Such an embodiment may include a method that may assign automatic variables to logical stacks and implement each logical stack through a stack pointer or a global array, for example.

Figure 1:
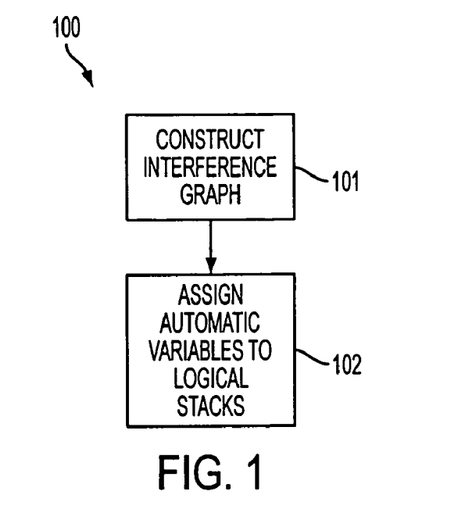
FIG. 1 depicts an exemplary embodiment of a method according to an embodiment of the invention.

FIG. 1 depicts flow chart 100, which illustrates an exemplary method for assigning automatic variables to logical stacks according to an embodiment of the invention. In an exemplary embodiment of the invention, a user may determine the maximum number of logical stacks. To assign automatic variables to a logical stack, in block 101, an interference graph may be constructed. In block 102, automatic variables may be assigned to logical stacks.

Figure 2:
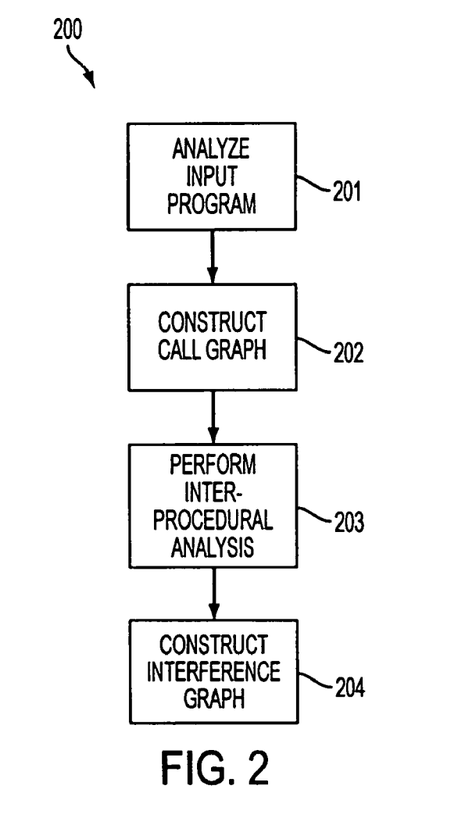
FIG. 2 depicts an exemplary embodiment of a method according to an embodiment of the invention.

FIG. 2 depicts flow chart 200, which illustrates an exemplary method for constructing an interference graph according to an embodiment of the invention. In an exemplary embodiment of the invention, in block 201, a program, or input program, may be analyzed by a compiler, for example, for access to automatic variables either directly or indirectly through pointer aliases. As referred to herein, two automatic variables may be said to interfere with each other if the two automatic variables are accessed in an instruction or statement in parallel. In an exemplary embodiment of the invention, the interference graph may be based on parallel accesses to a same memory bank.

In block 202, a call graph may be constructed for the program. In an exemplary embodiment of the invention, nodes in the call graph may correspond to functions of the program, and edges in the call graph may be directed and may connect caller functions to callee functions, for example.

Figure 5:
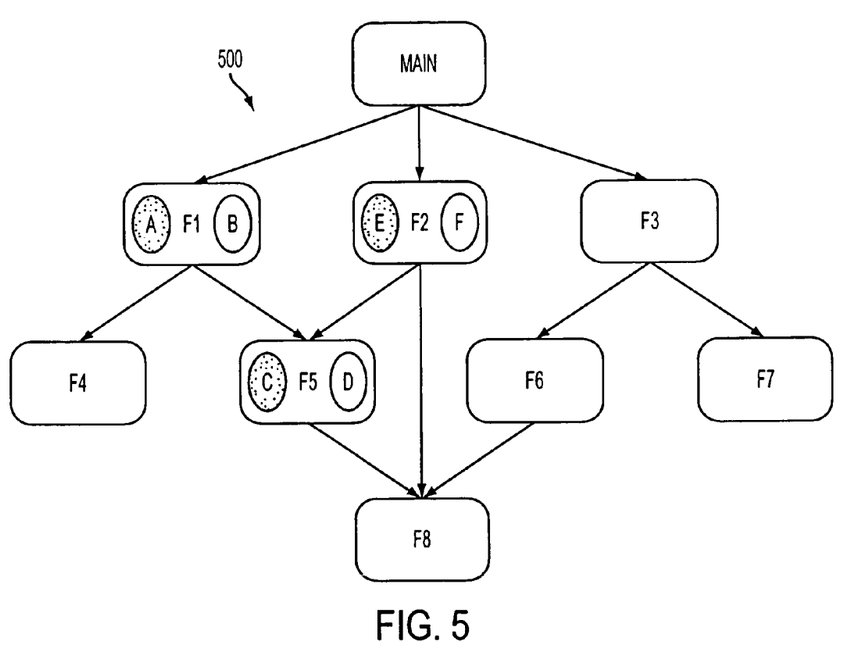
FIG. 5 depicts an exemplary embodiment of a call graph according to an embodiment of the invention.

FIG. 5 depicts an exemplary embodiment of a call graph 500 according to an embodiment of the invention. As shown in FIG. 5, call graph 500 may include nodes labeled main and F1-F8. The nodes may represent the functions of a program that is being analyzed. In an exemplary embodiment of the invention, the functions may be depicted as caller and/or callee functions. For example, as shown in FIG. 5, main may be a caller function that calls callee functions F1, F2, and F3. Similarly, F1 and F2 may be caller functions that call callee function F5.

In call graph 500, as shown in FIG. 5, automatic variables A and B may be accessed within function F1; automatic variables C and D may be accessed within function F5; and automatic variables E and F may be accessed within function F2. In an exemplary embodiment of the invention, the storage associated with variables A, C, and E may be allocated to one logical stack, while the storage associated with automatic variables B, D, and F may be assigned to another logical stack, as will be described below.

In block 203, an inter-procedural alias analysis may be performed. In an exemplary embodiment of the invention, an inter-procedural alias analysis may determine all possible aliases for each automatic variable.

Figure 6:
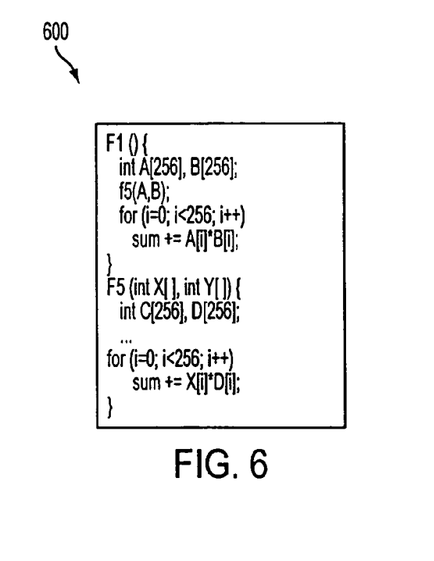
FIG. 6 depicts an exemplary embodiment of a code portion according to an embodiment of the invention.

FIG. 6 depicts an exemplary code portion 600 that illustrates the concept of aliasing for automatic variables. For example, as shown in FIG. 6, automatic variable X may be aliasing automatic variable A, and automatic variable Y may be aliasing automatic variable B.

In block 204, the interference graph may be constructed. In an exemplary embodiment of the invention, nodes in the interference graph may correspond to automatic variables defined in the functions. Further, in the interference graph, two automatic variables may have an interference arc between them if there are parallel accesses between the two automatic variables or between some aliases of the two automatic variables in an instruction or statement of a function of the program.

Figure 7:
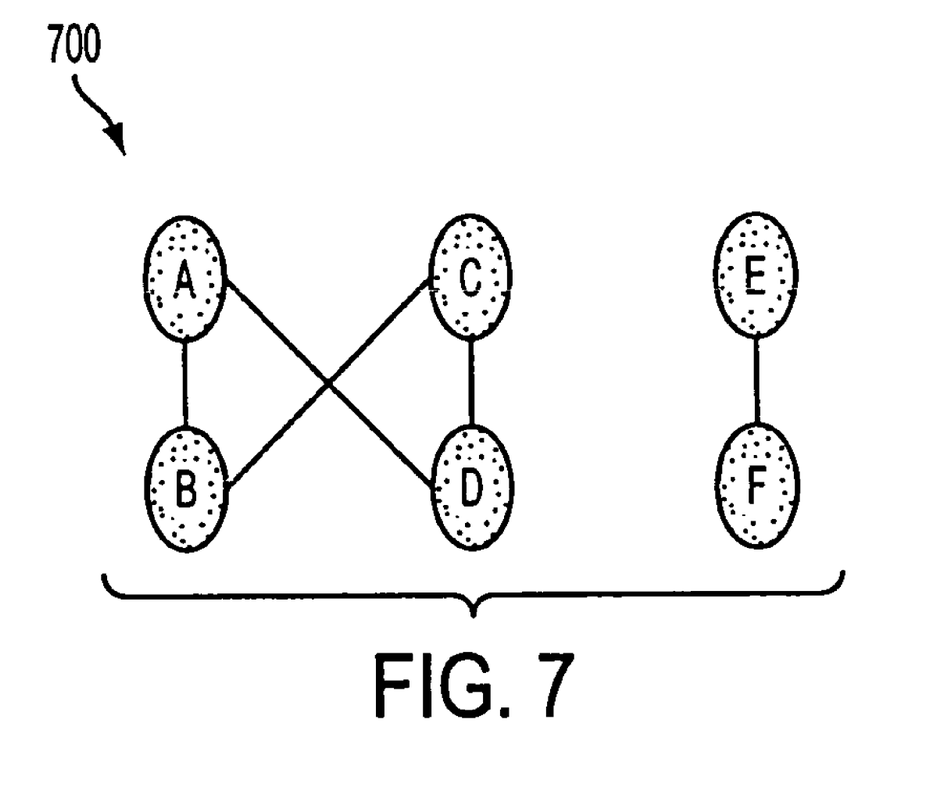
FIG. 7 depicts an exemplary embodiment of an interference graph according to an embodiment of the invention.

FIG. 7 depicts an exemplary embodiment of an interference graph 700 that may be constructed, at least in part, based on code portion 600 of FIG. 6. In an exemplary embodiment of the invention, interference graph may also be constructed based on parallel accesses of automatic variables within a code portion, such as, e.g., code portion 600. As shown in FIG. 7, interference graph 700 may be based in part on the aliasing and interferences within code portion 600, but may also include interferences that do not appear in code portion 600.

As shown in FIG. 7, the nodes A-F of interference graph 700 may correspond to automatic variables. The lines connecting the nodes may represent interferences between two automatic variables or between some aliases of the two automatic variables. For example, In FIG. 7, there may be an interference between automatic variables A and B because of a parallel access in loop F1 of code portion 600. Similarly, there may be an interference between automatic variables A and D because of a parallel access in loop F5 of code portion 600. As will be understood by a person having ordinary skill in the art, other interferences shown in interference graph 700, such as the interference between automatic variables E and F, are not shown in code portion 600, and are shown for illustrative purposes only.

Figure 3:
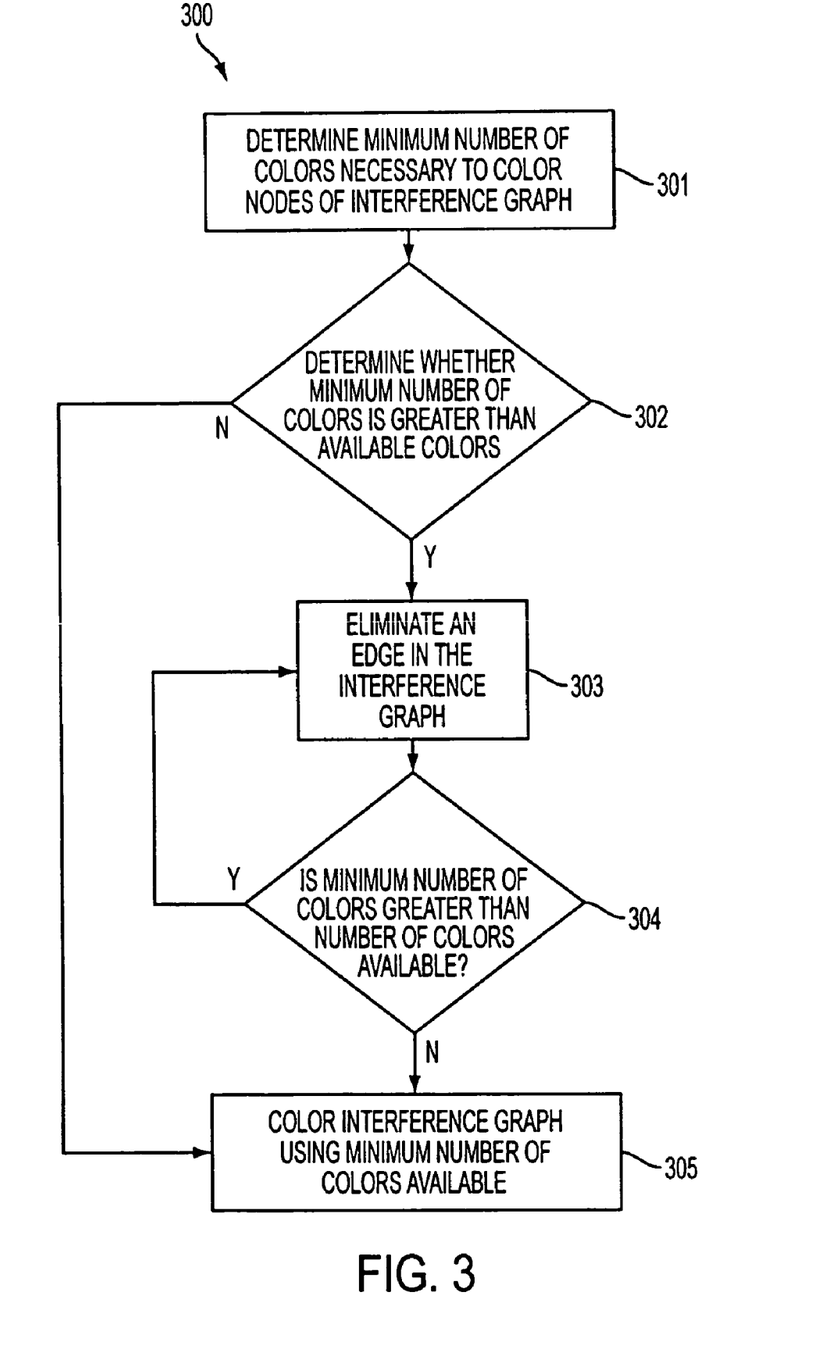
FIG. 3 depicts an exemplary embodiment of a method according to an embodiment of the invention.

FIG. 3 depicts flow chart 300, which illustrates an exemplary method for assigning automatic variables to logical stacks according to an exemplary embodiment of the invention. In an exemplary embodiment of the invention, assigning automatic variables to memory banks may use graph coloring. There are many graph coloring algorithms known in the art, and the invention is not limited to any such particular algorithm. To assign automatic variables to logical stacks, in block 301, a minimum number of colors necessary to color the nodes in the interference graph such that no two adjacent nodes are assigned the same color may be determined.

In block 302, a compiler, for example, may determine whether the minimum number of colors is greater than available colors. In an exemplary embodiment of the invention, a color may represent a logical stack. In such an embodiment, the number of available colors may represent the number of logical stacks used, for example, and this number may be selectable by implementation.

If the minimum number of colors is greater than the available colors, in block 303, an edge in the interference graph may be eliminated from the interference graph. In an exemplary embodiment of the invention, to eliminate an edge from the interference graph, the edges may be ordered based on a weight assignment for each edge. The weight assigned to each edge may be based on the potential parallelism of the edge, for example. In such an embodiment, an edge with the least weight may then be removed. In an alternative embodiment of the invention, an edge connecting a node with the highest degree to the node with the next highest degree, for example, may be eliminated from the interference graph. In such an embodiment, the degree may represent the number of edges connected to a node in the interference graph. The edge with the highest degree, i.e., the edge with the least amount of parallelism, may then be removed from the interference graph.

In block 305, the edges in the interference graph may be decorated with potential parallelism. In other words, the interference graph may be colored using the minimum numbers of colors available. As shown in FIG. 3, edges in the interference graph may be eliminated until the minimum number of colors is not greater than the number of colors available by returning to block 303 from block 304.

If, in block 302, the minimum number of colors in not greater than the number of colors available, the nodes of the interference graph may be colored using the minimum numbers of colors available in block 305.

In an exemplary embodiment of the invention, once the automatic variables are assigned to logical steps as described above, one logical stack may be implemented using a processor-defined stack mechanism, for example. In one embodiment of the invention, the remaining logical stacks may be implemented as physical stacks with a register assigned as a stack pointer. In a further embodiment of the invention, the remaining logical stacks may be implemented as a global array. In such an embodiment where the remaining logical stacks may be implemented as a global array, the automatic variables may be defined in non-recursive functions. In an exemplary embodiment of the invention, a user may determine whether to implement a logical stack as a physical stack or a global array.

Figure 4:
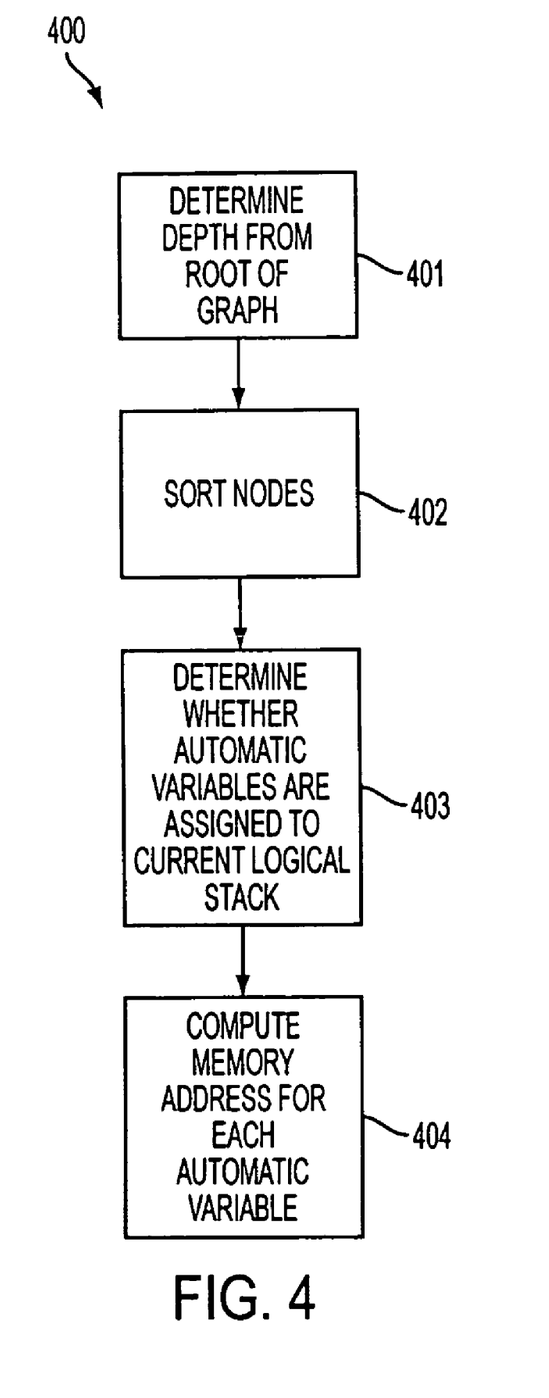
FIG. 4 depicts an exemplary embodiment of a method according to an embodiment of the invention.

FIG. 4 depicts flow chart 400, which illustrates an exemplary method for implementing a logical stack as a global array according to an embodiment of the invention. By using the global array, the overhead of allocating automatic variables dynamically may be eliminated. In such an embodiment, the maximum memory needed may be identical to that of a stack-based allocation.

In block 401, for each node in a call graph, the maximum depth from root of the graph may be determined. In an exemplary embodiment of the invention, this maximum depth may be labeled "level."

In block 402, the nodes in the call graph may be sorted. This sorting may be in ascending order of "level," for example.

In block 403, for each sorted node F (e.g., in ascending order of level), it may be determined whether there are any automatic variables assigned to a current logical stack.

If there are any automatic variables assigned to the current logical stack, in block 404, the memory address for each automatic variable may be computed. In an exemplary embodiment of the invention, the memory address for each automatic variable may be computed as a sum of a base address of the global array, the summed sizes of automatic variables defined in a function, and an offset of the automatic variable.

Figure 8:
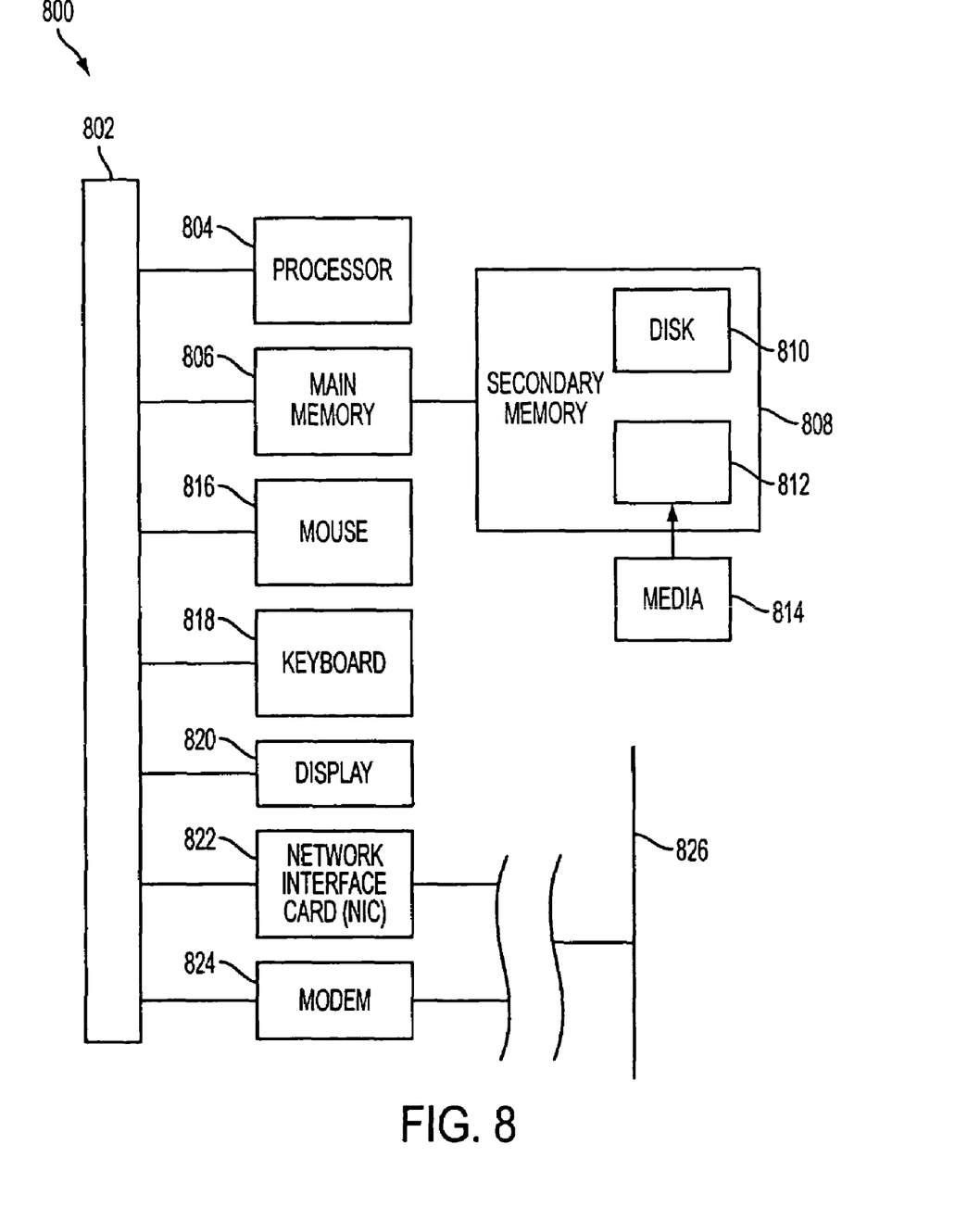
FIG. 8 depicts an exemplary embodiment of a computer and/or communications system as can be used for several components in an exemplary embodiment of the invention.

FIG. 8 depicts an exemplary embodiment of a computer and/or communications system as may be used for several components of the system in an exemplary embodiment of the present invention. FIG. 8 depicts an exemplary embodiment of a computer 800 as may be used for several computing devices in exemplary embodiments of the present invention. Computer 800 may include, but is not limited to: e.g., any computer device, or communications device including, e.g., a personal computer (PC), a workstation, a mobile device, a phone, a handheld PC, a personal digital assistant (PDA), a thin client, a fat client, a network appliance, an Internet browser, a paging, or alert device, a television, an interactive television, a receiver, a tuner, a high definition (HD) television, an HD receiver, a video-on-demand (VOD) system, a server, or other device.

Computer 800, in an exemplary embodiment, may comprise a central processing unit (CPU) or processor 804, which may be coupled to a bus 802. Processor 804 may, e.g., access main memory 806 via bus 802. Computer 800 may be coupled to an Input/Output (I/O) subsystem such as, e.g., a network interface card (NIC) 822, or a modem 824 for access to network 826. Computer 800 may also be coupled to a secondary memory 808 directly via bus 802, or via main memory 806, for example. Secondary memory 808 may include, e.g., a disk storage unit 810 or other storage medium. Exemplary disk storage units 810 may include, but are not limited to, a magnetic storage device such as, e.g., a hard disk, an optical storage device such as, e.g., a write once read many (WORM) drive, or a compact disc (CD), or a magneto optical device. Another type of secondary memory 808 may include a removable disk storage device 812, which may be used in conjunction with a removable storage medium 814, such as, e.g. a CD-ROM, or a floppy diskette. In general, the disk storage unit 810 may store an application program for operating the computer system referred to commonly as an operating system. The disk storage unit 810 may also store documents of a database (not shown). The computer 800 may interact with the I/O subsystems and disk storage unit 810 via bus 802. The bus 802 may also be coupled to a display 820 for output, and input devices such as, but not limited to, a keyboard 818 and a mouse or other pointing/selection device 816.

The embodiments illustrated and discussed in this specification are intended only to teach those skilled in the art various ways known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. A method comprising:
   analyzing a program to obtain information about variables within the program;
   generating a call graph based on the information;
   determining all possible aliases for each variable;
   identifying parallel accesses by at least one of two variables, a variable and an alias, or two aliases during an instruction in the program;
   generating an interference graph based on the parallel accesses; and
   assigning the variables to logical stacks based on the interference graph, wherein said assigning comprises:
   assigning a constant value to represent the number of stacks permitted;
   determining a minimum number of logical stacks needed so that interfering variables are not assigned to the same logical stack;
   determining whether the minimum number of stacks needed is greater than a number of stacks permitted;
   removing edges in the interference graph if the minimum number of stacks needed is greater than the number of stacks permitted; and
   assigning the variables to logical stacks.

2. The method according to claim 1, wherein the variables are automatic variables.

3. The method according to claim 1, wherein said call graph comprises nodes to represent functions in the program and edges to connect caller functions to callee functions.

4. The method according to claim 1, wherein said interference graph comprises nodes corresponding to the variables defined in the program and edges to represent parallel accesses by at least one of two variables, a variable and an alias, or two aliases during an instruction in the program.

5. The method according to claim 1, further comprising:
   implementing the logical stacks as physical stacks with a register-assigned stack pointer.

6. The method according to claim 1, further comprising:
   implementing the logical stacks as a global array.

7. The method according to claim 6, said implementing comprising:
   determining a maximum depth from a root of the call graph for each node in the call graph;
   sorting the nodes in the call graph in ascending order of maximum depth; and
   computing a memory address for each variable.

8. A system comprising:
   memory having a plurality of logical stacks to store variables of a program; and
   a computer system equipped with a compiler to perform a method comprising:
   analyzing a program to obtain information about variables within the program;
   generating a call graph based on the information;
   determining all possible aliases for each variable;
   identifying parallel accesses by at least one of two variables, a variable and an alias, or two aliases during an instruction in the program;
   generating an interference graph based on the parallel accesses; and
   assigning the variables to logical stacks based on the interference graph, wherein said assigning comprises:
   assigning a constant value to represent the number of stacks permitted;
   determining a minimum number of logical stacks needed so that interfering variables are not assigned to the same logical stack;
   determining whether the minimum number of stacks needed is greater than a number of stacks permitted;
   removing edges in the interference graph if the minimum number of stacks needed is greater than the number of stacks permitted; and
   assigning the variables to logical stacks.

9. The system according to claim 8, wherein the variables are automatic variables.

10. The system according to claim 9, wherein said call graph comprises nodes to represent functions in the program and edges to connect caller functions to callee functions.

11. The system according to claim 9, wherein said interference graph comprises nodes corresponding to the variables defined in the program and edges to represent parallel accesses between variables.

12. A machine storage medium containing program instructions that, when executed by a processor, cause the processor to perform a series of operations comprising:
    analyzing a program to obtain information about variables within the program;
    generating a call graph based on the information, the call graph comprising nodes to represent functions in the program and edges to connect caller functions to callee functions;
    determining all possible aliases for each variable;
    identifying parallel accesses by at least one of two variables, a variable and an alias, or two aliases bank during an instruction in the program;

generating an interference graph based on the parallel accesses, the interference graph comprising nodes corresponding to the variables defined in the program and edges to represent parallel accesses by at least one of two variables, a variable and an alias, or two aliases during an instruction in the program; and assigning the variables to logical stacks based on the interference graph, wherein said assigning comprises:

assigning a constant value to represent the number of stacks permitted;

determining a minimum number of logical stacks needed so that interfering variables are not assigned to the same logical stack;

determining whether the minimum number of stacks needed is greater than number of stacks permitted;

decorating the interference graph if the minimum number of stacks needed is greater than the number of stacks permitted; and assigning the variables to logical stacks.

13. The machine storage medium according to claim 12, said decorating comprising:

removing edges in the interference graph.

14. The machine storage medium according to claim 12, further containing program instructions that, when executed by the processor cause the processor to perform further operations comprising:

implementing the logical stacks as physical stacks with a register-assigned stack pointer.

15. The machine storage medium according to claim 12, further containing program instructions that, when executed by the processor cause the processor to perform further operations comprising:

implementing the logical stacks as a global array.

16. The machine storge medium according to claim 15, said implementing comprising:

determining a maximum depth from a root of the call graph for each node in the call graph;

sorting the nodes in the call graph in ascending order of maximum depth; and computing a memory address for each variable.

17. The machine storge medium according to claim 12, wherein the variables are automatic variables.

18. The method according to claim 1, wherein the constant value representing the number of stacks permitted is greater than two.

19. The system according to claim 8, wherein the constant value representing the number of stacks permitted is greater than two.

20. The machine storage medium according to claim 12, wherein the constant value representing the number of stacks permitted is greater than two.

* * * * *